United States Patent
Endres et al.

(10) Patent No.: US 6,337,878 B1
(45) Date of Patent: Jan. 8, 2002

(54) ADAPTIVE EQUALIZER WITH DECISION DIRECTED CONSTANT MODULUS ALGORITHM

(75) Inventors: Thomas J Endres, Pipersville, PA (US); Samir N Hulyalkar, Plainsboro, NJ (US); Christopher H Strolle, Glenside; Troy A Schaffer, Langhorne, both of PA (US)

(73) Assignee: Nxt Wave Communications, Langhorne, PA (US)

( * ) Notice: Subject to any disclaimer, the term of this patent is extended or adjusted under 35 U.S.C. 154(b) by 0 days.

(21) Appl. No.: 09/261,843

(22) Filed: Mar. 3, 1999

(51) Int. Cl.[7] .................................................. H03H 7/40
(52) U.S. Cl. ........................ 375/229; 375/232; 375/346; 375/350; 708/322; 708/323
(58) Field of Search ................................. 375/229, 232, 375/233, 340, 346, 347, 350; 708/322, 323

(56) References Cited

U.S. PATENT DOCUMENTS

| 5,311,546 A | * | 5/1994 | Paik et al. ..................... 375/14 |
| 5,414,732 A | * | 5/1995 | Kaufmann .................. 375/232 |
| 5,586,068 A | * | 12/1996 | Rakib ......................... 364/724 |
| 5,654,765 A | * | 8/1997 | Kim ............................ 348/614 |
| 5,835,532 A | * | 11/1998 | Strolle et al. ................ 375/233 |
| 6,075,816 A | * | 6/2000 | Werner et al. ............... 375/229 |

* cited by examiner

Primary Examiner—Stephen Chin
Assistant Examiner—Dac V. Ha
(74) Attorney, Agent, or Firm—Allan Jacobson

(57) ABSTRACT

An adaptive equalizer for use in blind equalization systems to compensate for transmission channel distortion and noise in a digital communication system quantizes the input signal samples to generate a quantized implementation of the Constant Modulus Algorithm (CMA). To quantize the input signal samples, a nearest-element decision device (a slicer), that is typically present in a digital receiver, is used to pre-compute the quantized CMA error function. The number of unique values for the CMA error term is thereby reduced, and the reduced number of CMA error term values are stored in a lookup table. By greatly reducing the number of received signal values used in the CMA error calculation a relatively small lookup table can be used to compute the CMA error function. Passband implementation is accommodated by incorporating the signal de-rotation factor into the lookup table entries. In one embodiment the CMA multiply operation is replaced with shifts and adders. To make efficient use of shift and add operations to achieve multiplication in the adaptation process, the lookup table values are selected to be either a power of 2 or a minimal sum of powers of 2.

13 Claims, 14 Drawing Sheets

PASSBAND VSB

BASEBAND VSB

PASSBAND QAM

ADAPTIVE EQUALIZER WITH DECISION DIRECTED CONSTANT MODULUS ALGORITHM

FIELD OF THE INVENTION

The present invention relates to equalization techniques to compensate for channel transmission distortion in digital communication systems. In particular, the present invention relates to the efficient baseband and passband implementations of the Constant Modulus Algorithm (CMA), an equalization algorithm used in blind equalization systems.

BACKGROUND OF THE INVENTION

Digital transmission of information typically involves the modulation of pulses onto an RF carrier's amplitude and/or phase. Most propagation mediums (terrestrial, cable, underwater, etc.) introduce signal distortion. Factors that cause distortions include noise, signal strength variations, phase shift variations, multiple path delays, and the like.

Noise is also known as static. Signal strength variations are commonly known as fading. In addition, multiple different paths between the transmitter and receiver through the propagation medium cause multiple path delays. The different paths have different delays that cause replicas of the same signal to arrive at different times at the receiver (like an echo). Multi-path distortion results in inter-symbol interference (ISI) in which weighted contributions of other symbols are added to the current symbol.

In addition to distortion and noise from the propagation medium, front-end portions of the receiver and transmitter also introduce distortion and noise. The presence of distortion, noise, fading and multi-path introduced by the overall communication channel (transmitter, receiver and propagation medium), can cause digital systems to degrade or fail completely when the bit error rate exceeds some threshold and overcomes the error tolerance of the system.
Equalization Digital systems transmit data as symbols having discrete levels of amplitude and/or phase. To the extent that a symbol is received at a level that differs from one of the allowed discrete levels, a measure of communication channel error can be detected.

The digital receiver uses a slicer to make hard decisions as to the value of the received signal. A slicer is a decision device responsive to the received signals at its input, which outputs the projection of the nearest symbol value from the grid of constellation points. The output of the slicer thus corresponds to the allowed discrete levels.

At the receiver, it is known to use an equalizer responsive to the detected error to mitigate the signal corruption introduced by the communications channel. It is not uncommon for the equalizer portion of a receiver integrated circuit to consume half of the integrated circuit area.

An equalizer is a filter that has the inverse characteristics of the communication channel. If the transmission characteristics of the communication channel are known or measured, then the equalization filter parameters can be set directly. After adjustment of the equalization filter parameters, the received signal is passed through the equalizer, which compensates for the non-ideal communication channel by introducing compensating "distortions" into the received signal which tend to cancel the distortions introduced by the communication channel.

However, in most situations such as in broadcasting, each receiver is in a unique location with respect to the transmitter.

Accordingly, the characteristics of the communication channel are not known in advance, and may even change with time. In those situations where the communication channel is not characterized in advance, or changes with time, an adaptive equalizer is used. An adaptive equalizer has variable parameters that are calculated at the receiver. The problem to be solved in an adaptive equalizer is how to adjust the equalizer filter parameters in order to restore signal quality to a performance level that is acceptable by subsequent error correction decoding.

In some adaptive equalization systems, the parameters of the equalization filter are set using a predetermined reference signal (a training sequence), which is periodically sent from the transmitter to the receiver. The received training sequence is compared with the known training sequence to derive the parameters of the equalization filter. After several iterations of parameter settings derived from adaptation over successive training sequences, the equalization filter converges to a setting that tends to compensate for the distortion characteristics of the communications channel.

In blind equalization systems, the equalizer filter parameters are derived from the received signal itself without using a training sequence. In the prior art, it is known to adjust the equalizer parameters blindly using the Least Mean Squares (LMS) algorithm, in which the training symbols are replaced with hard decisions, or best estimates of the original input symbols. Blind equalization systems using LMS in this manner are referred to as decision directed LMS (DD-LMS).

However, the DD-LMS algorithm requires a good initial estimate of the input signal. For most realistic communication channel conditions, the lack of an initial signal estimate results in high decision error rates, which cause the successively calculated equalizer filter parameters to continue to fluctuate, rather than converge to a desired solution. The parameters are said to diverge in such a case.

It is also known to use another algorithm, called the Constant Modulus Algorithm (CMA), in combination with the DD-LMS algorithm from a cold start. See D. N. Godard, "Self-recovering equalization and carrier tracking in two-dimensional data communication systems," IEEE Transactions on Communications, vol. 28, no 11, pp. 1867–1875, October 1980, or J. R. Treichler, B. G. Agee, An New Approach To Muli-Path Correction Of Constant Modulus Signals, IEEE Transactions On Acoustics Speech And Signal Processing, vol ASSP-31, no.2, page 459–472 April 1983. The CMA algorithm is used first to calculate the equalizer filter parameters, which is regarded as an initial estimate. Thereafter, the equalizer filter parameters (as calculated by the CMA algorithm) are used in an acquisition mode to find the initial equalizer filter parameters to start the DD-LMS algorithm.

The CMA algorithm (as well as the DD-LMS algorithm) is usually implemented with a gradient descent strategy in which the equalizer parameters are adapted by replacing the present equalizer parameter settings with their current values plus an error (or correction) term. See C. R. Johnson, Jr., P. Schniter, T. J. Endres, J. D. Behm, D. R. Brown, R. A. Casas, "Blind equalization using the constant modulus criterion: a review," Proceedings of the IEEE, vol. 86, no. 10, pp. 1927–1950, October, 1998. The CMA error term itself is a cubic function of the equalizer output.

From a cold start, the receiver enters an acquisition mode. In the acquisition mode, the CMA algorithm is used first to adjust the equalizer parameters. Then, after a fixed period of time (or alternatively based on a measure, which is derived from the equalizer output), the receiver switches to the DD-LMS algorithm in a tracking mode. The acquisition mode typically requires up to 400,000 symbols. At a 10 MHz clock rate, the symbol rate is 100 nanoseconds and the time available for acquisition using the CMA algorithm is about 40 milliseconds. Overall, between the initial CMA algorithm and the following DD-LMS algorithm, the equalizer has about 100–200 milliseconds to converge.

A critical factor in an adaptive equalization system is to complete all the required multiplication operations within the time available: i.e., a single symbol interval (100 nanoseconds in the above example). In particular, the CMA error term calculation requires successive multiply operations for each equalizer parameter. One real multiply per equalizer parameter is needed for one-dimensional signaling, and one complex multiply (equivalent to 4 real multiplies) per equalizer parameter are needed for two-dimensional signaling.

Since a typical equalizer filter may have up to 512 filter coefficients (the number of equalizer filter parameters), the total time required to complete all the required multiplication operations with full precision often exceeds one symbol interval. That is, the large number of multiply operations often takes so long that the total time needed for calculation of all the equalizer filter coefficients exceeds the available time limit of one symbol interval. Thus, although the prior art scheme to use CMA and DD-LMS in series is theoretically possible, the large number of multiply operations prevents practical, economical commercial implementations in reasonably sized integrated circuit components.

One prior art solution to the problem of economical implementation includes calculating subsets of the equalizer filter coefficients in successive symbol intervals. Another prior art approach is to simplify the error term multiplication by using only the sign of the error term, i.e., +1 or −1. In LMS, this variation is referred to as signed-error LMS (SE-LMS) in which the usual LMS error term is replaced by the sign (±1) of the error. SE-LMS is easily implemented since the usual multiplier per equalizer parameter in the LMS update equation is replaced by a simple bit flip (a sign change) to represent multiplication by +1 or −1. Similarly, in CMA a signed-error CMA (SE-CMA), is used to replace the usual, full precision CMA error term with its sign (+1 or −1).

Since multiplication by +1 or −1 is just a sign change, multiply calculations are very rapid. A modification of the signed error approach is to use three levels, +1, 0, −1 for the error term in the multiplication. Since the number 0 is neither positive nor negative, multiplication by +1, 0, −1 is still a simple and quick operation. However, approximating a term by its sign sacrifices accuracy and can increase the time required for the adaptive equalizer to converge to a solution. Furthermore, convergence is not guaranteed.

SUMMARY OF THE INVENTION

The present invention is embodied in a blind equalization system in which a quantized version of the CMA error function is computed using quantized input samples and stored in a lookup table (LUT). In particular, the quantized CMA error function is pre-computed by first quantizing input signal samples, then computing the quantized CMA error function based on the quantized input samples and storing the resulting quantized CMA error function in the lookup table memory. Use of quantized input signal samples to compute the CMA error function may be described as a decision directed CMA (DD-CMA) error function.

To quantize the input signal samples, a nearest-element decision device (a slicer), that is typically present in a digital receiver, is conveniently used in pre-computing the quantized CMA error function. Alternatively, a quantizer with different levels than the available slicer, and/or more levels than the available slicer is used to quantize the input samples. The result of quantizing the CMA error function by quantizing the input signal samples increases the quantization precision in areas of the CMA error function typically encountered when the equalizer parameters are near convergence. Conversely, quantization precision is reduced in the areas of the CMA error function typically encountered when the equalizer parameters are first set during initial signal acquisition.

The present technique for computing the DD-CMA error function in place of the CMA error function reduces the number of unique values for the DD-CMA error term. Due to the relatively reduced number of DD-CMA error term values, a lookup table solution becomes practical. That is, the output of the slicer assumes relatively few levels (i.e., the correct level for each transmitted symbol) as compared to the received signal samples at the output of the equalization filter, which can assume any level. As a result of using the output of the slicer (instead of the input of the slicer), the DD-CMA error term itself assumes a relatively small number of unique values. Each of these possible unique values for the DD-CMA error term is stored in a lookup table. In such manner, the DD-CMA error term is computed using a relatively small lookup table. A lookup table implementation is easily accomplished with one symbol interval so that latency is greatly reduced.

For example, in an 8 VSB system using an 8 bit digital/analog converter, the number of possible signal levels at the output of the receiver equalizer is 256. However, at the output of the slicer, number of possible signal levels is reduced to 8. By greatly reducing the number of received signal values used in the DD-CMA error calculation a relatively small lookup table can be used to compute the DD-CMA error function.

In the preferred embodiment the large number of multiply operations normally required in the application of the CMA error term for equalizer adaptation is replaced with programmable shifts and adders which values are retrieved in the receiver using a lookup table.

DETAILED DESCRIPTION

Figure 1:
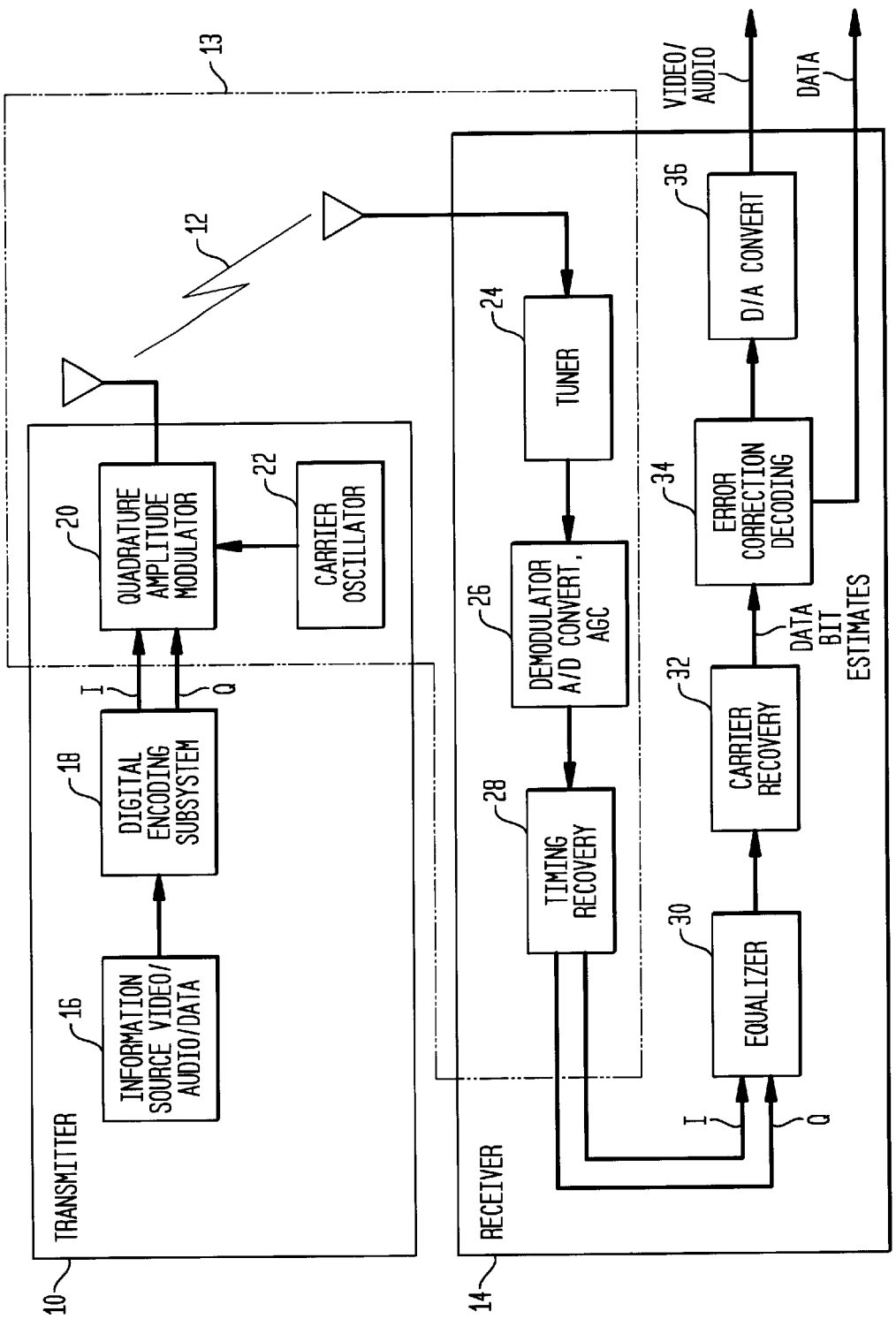
FIG. 1 is a block diagram of a digital communication system employing an equalizer in accordance with the present invention.

A typical quadrature amplitude modulation (QAM) communications system has a transmitter station 10 and a receiver station 14, coupled together via a suitable propagation medium 12, as shown in FIG. 1. The transmitter station 10 includes an information source 16 such as video, audio and/or data coupled to a digital encoding subsystem 18. The in-phase component (I) and quadrature phase component (Q) from the QAM digital encoding subsystem 18 are coupled to QAM modulator 20, which modulates the I and Q signal components onto a suitable carrier frequency (provided by carrier oscillator 22) for transmission into the propagation medium 12.

The receiving station 14 includes a tuner 24, demodulator, A/D converter, and AGC (automatic gain control) functions 26, and a timing recovery module 28. The timing recover module 28, reproduces the signal time slicing so that it is aligned with the original I and Q signals in the receiver. The receiving station 14 further includes an adaptive equalizer 30, a carrier recovery function 32, an error correction decoding function 34, and a digital to analog (D/A) converter 36. All of the elements between the original I and Q signals at the output of the digital encoding subsystem 18 in the transmitter, up to the input to the equalizer 30 in the receiver is regarded as the overall communication channel 13. The function of the equalizer 30 in the receiver is to compensate for distortion and noise originating anywhere in the overall communication channel 13.

In operation, the tuner 24 selects an appropriate carrier frequency from the propagation medium 12. The output of tuner 24 is converted to digital samples in an A/D converter and demodulated 26 to the correct frequency range. Also, the AGC 26 feedback loop automatically adjusts the receiver gain level. The timing recovery function 28 pulls the local crystal oscillator which governs the A/D sampling clock into phase lock with the incoming signal. The recovered I and Q signal components from the timing recovery module 28 are input to the equalizer 30.

The output of the equalizer 30 is coupled to a carrier recovery module 32 which pulls the local crystal oscillator into precise carrier frequency and phase lock, and provides data bit estimates to the error correction decoder 34. After error correction decoding 34, the digital data is recovered, and reproductions of the original data, video, and audio are output from the receiver 14. The present invention is embodied in the equalizer 30 portion of the communication system.

Passband Forward Equalization

Figure 2:
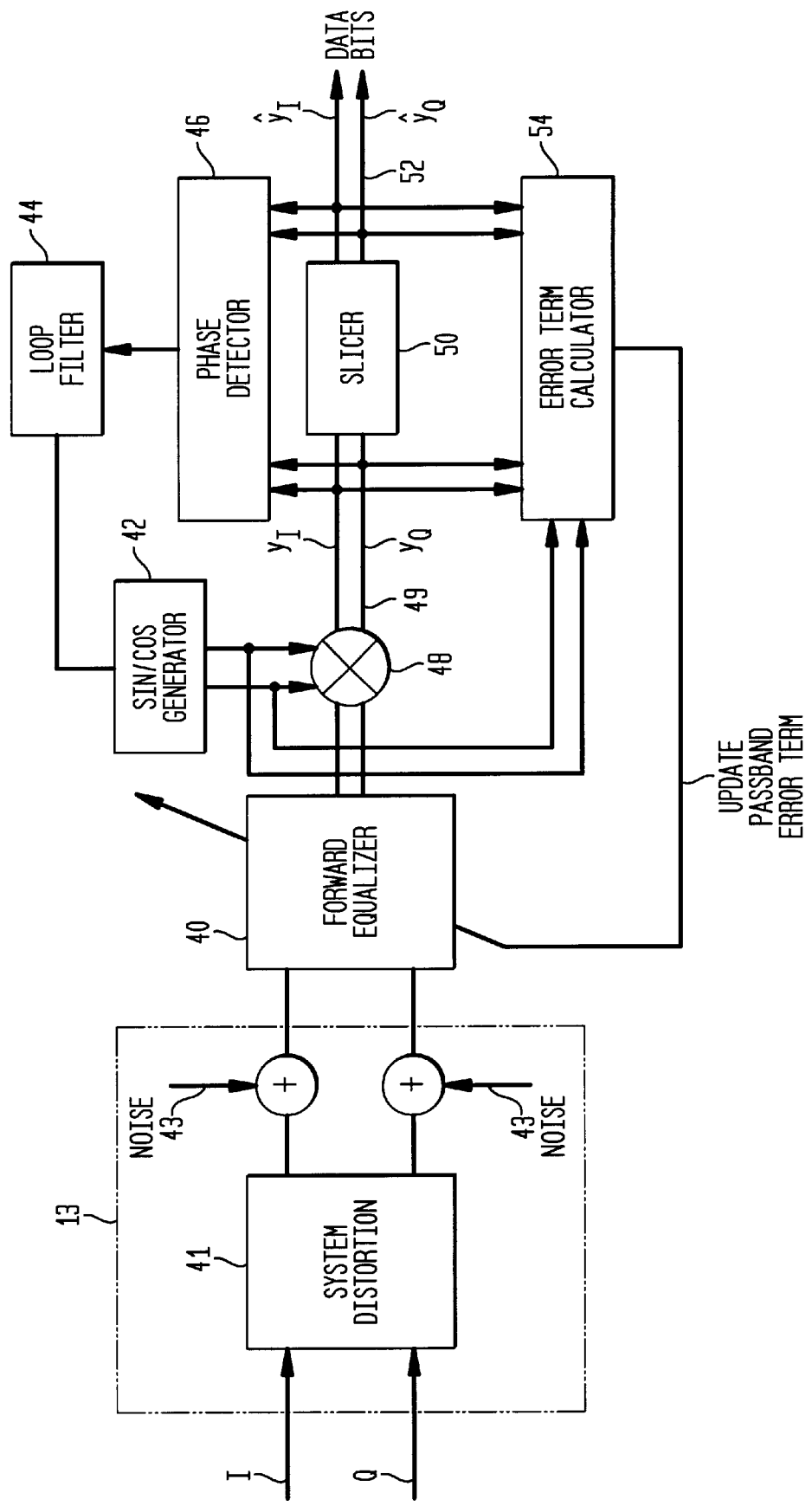
FIG. 2 is a block diagram of a baseband equalizer using the CMA and LMS algorithms in accordance with the present invention.

Further details of the equalizer 30 and carrier recovery 32 portions of FIG. 1 are shown in FIG. 2. As indicated, the overall communication channel 13 introduces system distortion 41 and noise 43 into the I and Q signal components from the transmitter. The received I and Q signal components at the receiver are input to the forward equalizer 40, which is typically implemented as a finite impulse response (FIR) filter. The output of the forward equalizer 40 is input to a mixer (multiplier) 48 which translates the processed I and Q signal components to baseband frequency (DC). The process of translating the received signal to baseband (demodulation), is also called de-rotation. See Lee and Messerschmitt, Digital Communications, Kluwer Academic Publishers, 1988.

The output of the mixer 48 is coupled to a slicer 50, which is set for nominal decision threshold levels that correspond to each symbol in the expected QAM constellation. The input YI and YQ to the slicer 50 are the actual received signal levels which have been filtered 40 and de-rotated 48. After the slicer 50, the output YI^ and YQ^ represent hard decision levels which correspond to the expected signal levels in the QAM constellation.

The phase detector 46, loop filter 44 and sine/cosine generator 42 in combination with multiplier 48 constitute a closed loop for recovering the frequency and phase of the carrier signal. The phase difference of input signals 49 (YI and YQ) and output signals 52 (YI^ and YQ^) of slicer 50 is detected in phase detector 46. The detected phase difference, filtered in loop filter 44 controls the frequency and phase of the sine/cosine generator 42 in a direction so as to reduce the detected phase difference between the input signals to the phase detector 46. At steady state, the carrier loop tracks the input carrier frequency and phase. See Meyr et al., Digital Communication Receivers, John Wiley & Sons, 1998.

Both input YI and YQ and output YI^ and YQ^ are input to an error term calculator 54. To the extent that the inputs and outputs of the slicer 50 are not equal, the error term calculator 54 provides an output to update the passband error term in the forward equalizer 40. The error term calculator operates on baseband signals. In order to generate a passband error term, the local carrier loop signal (at the output of sine/cosine generator 42) is input to the error term calculator 54. The present invention relates to the efficient implementation of the error term calculator 54 which also leads to an efficient implementation of the equalizer update in the forward equalizer, 40.

Baseband Feedback Equalization and Passband Forward Equalization

Figure 3:
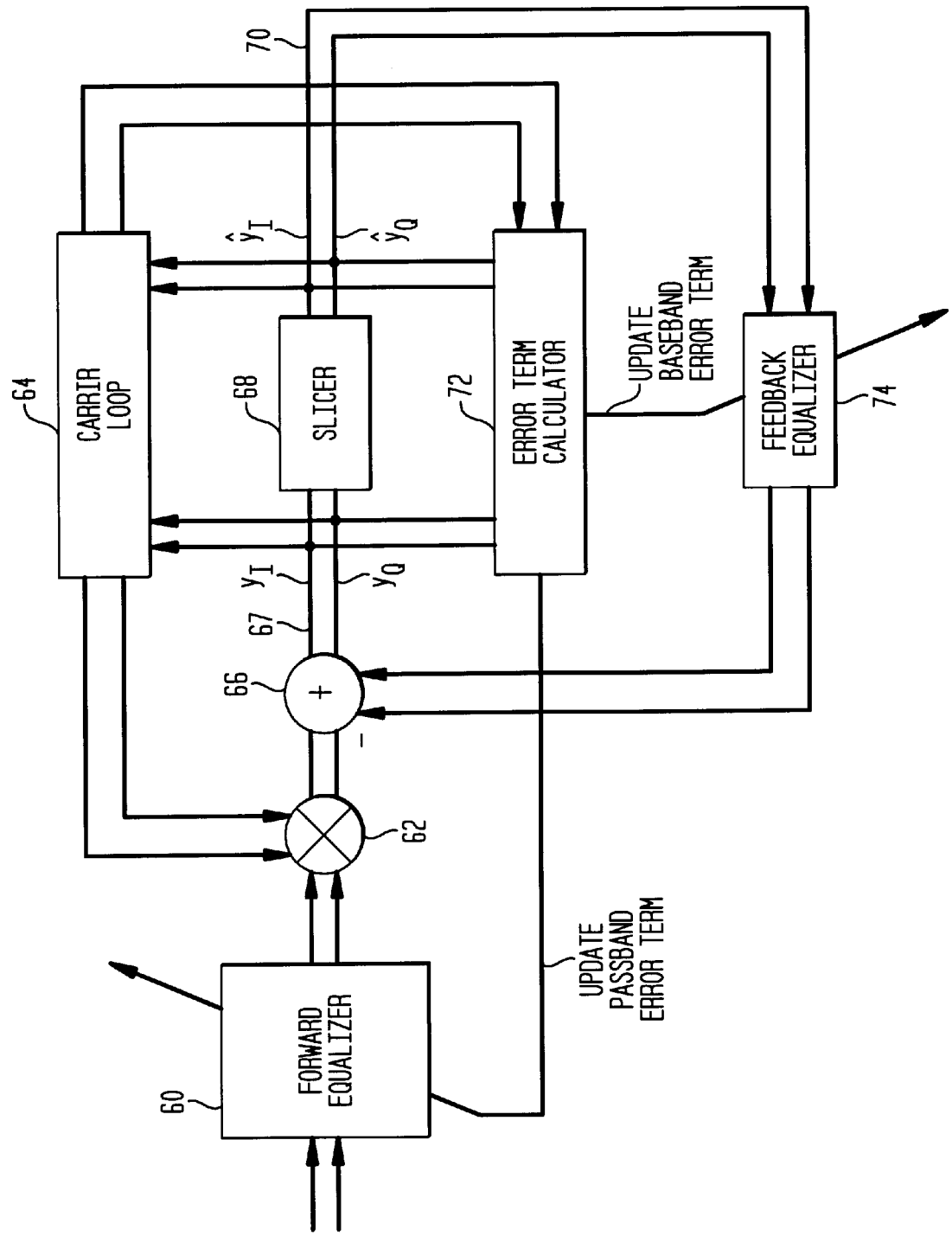
FIG. 3 is a block diagram of a passband equalizer using the CMA and LMS algorithms in accordance with the present invention.

An alternate implementation of the equalizer 30 and carrier recovery 32 of FIG. 1, is shown in FIG. 3. The implementation of FIG. 3 is similar to that of FIG. 2, except that feedback equalization at baseband is included in addition to forward equalization at passband. The added elements in FIG. 3 are an adder 66 and a feedback equalizer 74. The forward equalizer 60 is substantially the same as the forward equalizer 40 in FIG. 2. The slicer 68 in FIG. 3 is substantially similar to the slicer 50 of FIG. 2. Carrier loop 64 in FIG. 3 encompasses substantially the same components as sine/cosine generator 42, loop filter 44 and phase detector 46 of FIG. 2. However, while error calculator 72 in FIG. 3 performs all the functions of error term calculator 54 in FIG. 2, it further provides an output signal to update the baseband error term to the feedback equalizer 74. The feedback equalizer 74 is implemented using an FIR filter imbedded in a feedback loop which makes the overall loop have an infinite impulse response.

Both inputs to the slicer YI and YQ, and outputs of the slicer YI^ and YQ^ are input to the error term calculator 72. To the extent that the inputs and outputs of the slicer 68 are not equal, the error term calculator 72 provides an output to update the passband error term in the forward equalizer 60. As before, in order to generate a passband error term, the local carrier loop signal is input to the error term calculator 72.

Error term calculator 72 provides error term updates for the parameters of both forward equalizer 60 at passband and feedback equalizer 74 at baseband. The present invention relates to the efficient implementation of the error term calculator 72, which also leads to an efficient implementation of the equalizer update in the forward equalizer, 60, and the feedback equalizer 74.

As indicated above, the equalizer parameter vector is updated according to a gradient descent strategy in which the average parameter trajectory follows the steepest slope of the specified cost surface (i.e., the parameters move on average in the direction of the derivative of the cost function).

The Constant Modulus cost function is given by $$J_{CM} = E\{(g^2 - |y|^2)^2\}$$

where $g^2$ is a scalar referred to as Godard's (dispersion) constant, y is the baseband equalizer output, and $E\{.\}$ denotes expectation. The gradient can be found using complex vector calculus and is described by Godard or Treichler, cited above.

The baseband CMA error term $e_{bb}(k)$ is the derivative of $J_{CM}$ with the expectation removed and is given by $$e_{bb}(k) = y(k)(g^2 - |y(k)|^2)$$

The CMA error term $e_{bb}(k)$ is applied to a regressor vector of input samples which is of length equal to the number of equalizer parameters so that one multiplication per equalizer parameter is required to update the equalizer tapped delay line. For high data rate signaling, the number of multiplications can become computationally prohibitive. Reducing the computational burden is the motivation for the signed algorithms of the prior art described above. A sign operation (multiplication by 0, +1 or −1) is easily implemented as a bit flip in two's complement arithmetic. Therefore, no multiplier is needed, which significantly reduces the required chip die area. The present invention uses a quantized version of the CMA error term, which is implemented in lookup tables, and achieves low-precision multiplication using bit shifts and adders.

Figure 4:
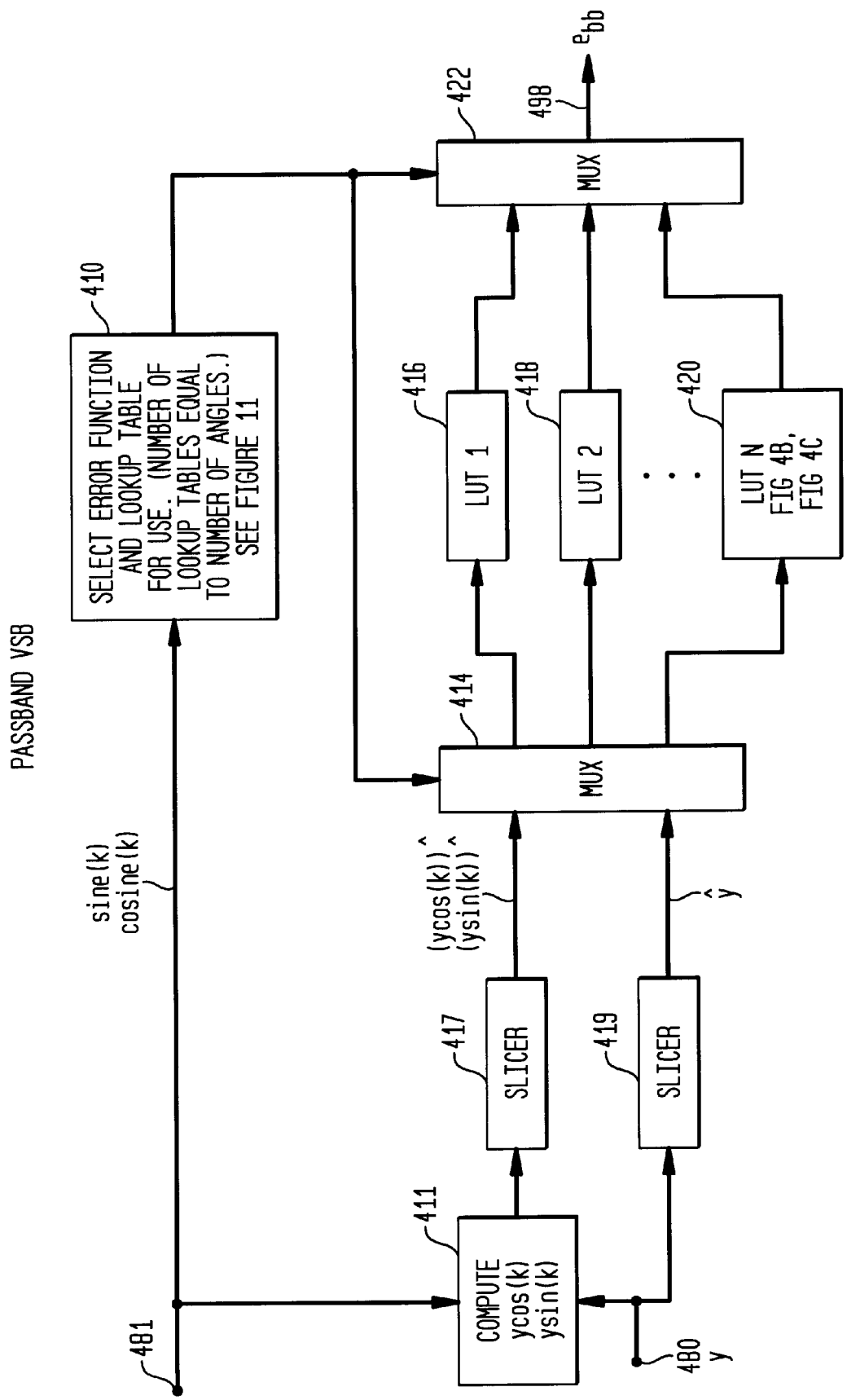
FIG. 4 is a block diagram of a decision directed CMA error term calculator for use in a passband VSB equalizer in accordance with the present invention.

In accordance with the present invention, the performance of the CMA algorithm in a blind equalization system is improved by quantizing the CMA error function by using quantized input samples to compute the DD-CMA error function and storing the resulting quantized DD-CMA function in one or more lookup tables. Block diagrams of various DD-CMA error calculators (quantizers) embodying the present invention are shown in FIGS. 4–4G. The baseband DD-CMA error term quantizer of FIG. 4D may be used in the baseband CMA error term calculator 72 in FIG. 3. The passband DD-CMA error term quantizer of FIG. 4F may be used in CMA error term calculator 72 in FIG. 3 and 54 in FIG. 2.

The quantizer of the present invention uses a variety of quantization strategies for efficient implementation of the Constant Modulus Algorithm (CMA). Each of the various strategies is based on quantizing the standard update CMA error term by quantizing the input samples, calculating the DD-CMA error term and storing the resulting quantized DD-CMA error term in a plurality of lookup tables. Thereafter, the DD-CMA error term can be efficiently determined during the receiver equalization process by accessing the appropriate lookup table. The invented decision based quantization is applied to both one-dimensional signals (such as Vestigial Sideband Modulation (VSB)) and two-dimensional signals (such as Quadrature Amplitude Modulation (QAM)) for both baseband and passband implementations.

Figure 4A:
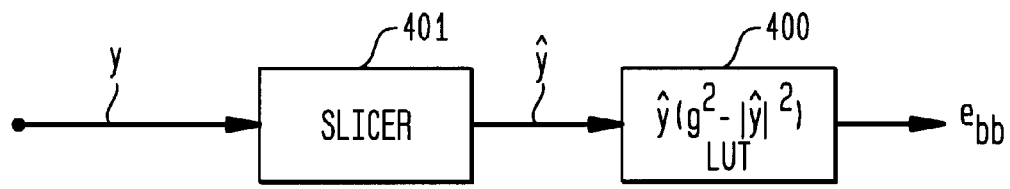
FIG. 4A is a block diagram of a decision directed CMA error term calculator for use in a baseband VSB equalizer in accordance with the present invention.

FIG. 4A shows a lookup table implementation of a DD-CMA error term calculator for use in a baseband VSB system. The received signal Y at the output of the equalizer, is input to slicer 401 which selects the nearest expected signal level, Y^. The slicer output Y^ is used as an input address to lookup table 400 from which the stored pre-computed value of the quantized DD-CMA error term, $e_{bb}$, corresponding to the input signal Y is retrieved.

FIG. 4 shows a lookup table implementation of a DD-CMA error term calculator for use in a passband VSB system. In FIG. 4, the input Y, at input terminal 480 is the baseband equalizer output. The sine and cosine waveforms in digital form corresponding to the local oscillator of the receiver are available as inputs. Also provided is a module 411 for computing $y_{cos}(k)$, and $y_{sin}(k)$, as defined below. Slicers 417 and 419 quantize each respective input to determine hard decisions. Though FIG. 4 shows two separate slicers, it is understood that access to a single on-chip slicer will be time-shared. The error quantizer of FIG. 4 includes an error function selector 410 responsive to the input sine/cosine input, to select an error function curve. Selector 410 also selects a lookup table from a plurality of lookup tables 416, 418, 420 (LUT 1, LUT 2, and LUT N), one for each possible selected error function curve. N in FIG. 4 is at most equal to the number of angle used in the sine/cosine generation. Multiplexers (MUX) 414 and 422 are responsive to selector 410, to select the appropriate lookup table 416, 418, or 420. Multiplexers 414 and 422 are implemented in digital form such as by computing the address where a desired lookup table is located in memory. The selected lookup table output provides the computed value of the quantized DD-CMA error term $e_{bb}(k)$ at terminal 498.

Figure 5:
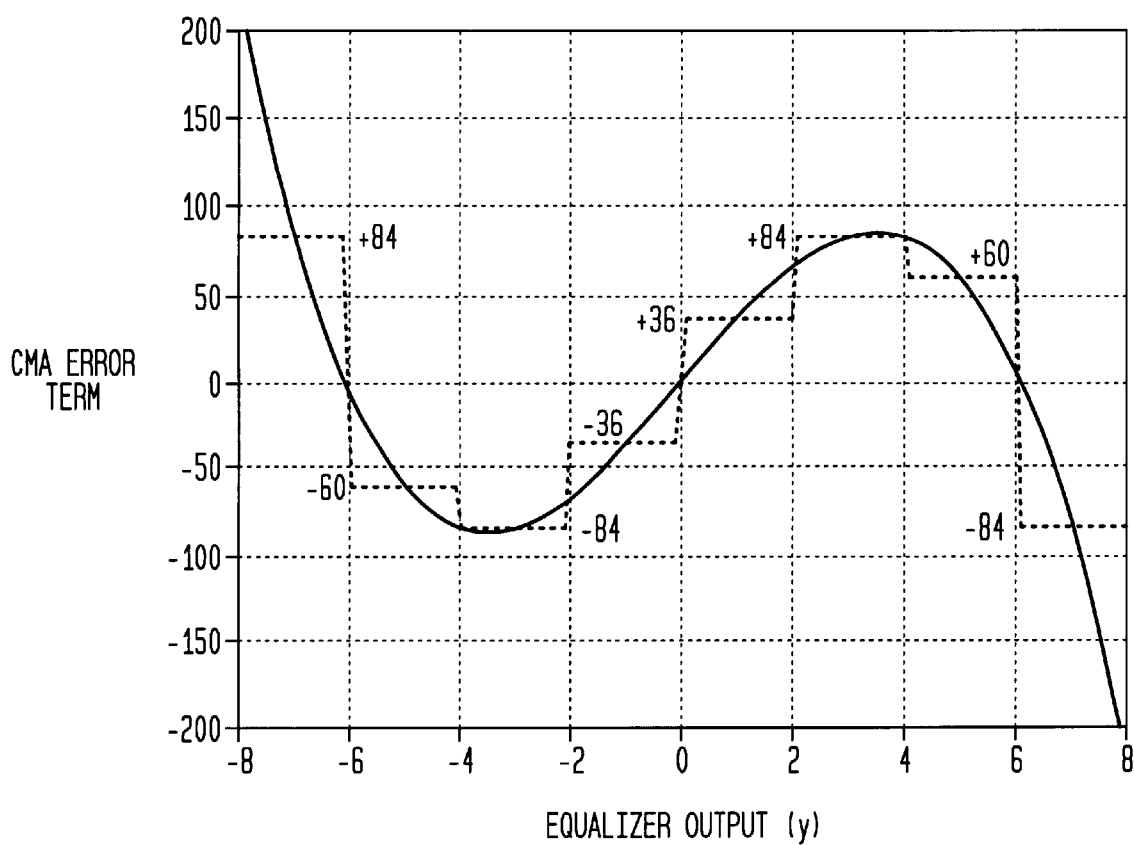
FIG. 5 is a graph of a CMA error function showing the use of 8 mid-tread quantization levels to quantize the DD-CMA error function in accordance with the present invention.

The CMA error term as shown by the solid curve in FIG. 5, is a cubic function of y which crosses through the origin, with roots $y = \{0, \pm g\}$. The CMA error calculation requires two multiplies and one add for real signal processing. In high data rate scenarios, the computation of the error term and its application to the update of the equalizer parameters can induce significant time delay that exceeds the symbol period. This processing delay can seriously degrade performance. The goal is the efficient approximation of the CMA error term, which is easily implemented within a symbol period.

A digital receiver chip normally contains a non-linear nearest-element decision device in hardware. The existing decision device takes signal sample y as its input and outputs the constellation point (or symbol value) y^ which has closest Euclidean distance to the input. The decision boundaries are chosen midway between symbol values.

In the present invention, the DD-CMA error term is computed using quantized input estimates, y^, instead of full precision samples Y. For example the DD=CMA error term for baseband VSB signaling is given by $$e(DD\text{-}CMA)=Y^{\hat{}}(g^2-|y^{\hat{}}|^2)$$

As a consequence, the DD-CMA error function assumes a finite number of values since y^ assumes a finite number of values. For example, with M-VSB signaling, the decision directed CMA (DD-CMA) error term assumes at most M/2 unique magnitudes. Hence, the baseband DD-CMA error term is efficiently calculated by using a lookup table 400 which is addressed using y(k), as illustrated in FIG. 4A. The lookup table 400 in FIG. 4A replaces the two multiplies and one add needed to calculate the usual CMA error term, and has no greater than M possible entries (M/2 unique magnitudes with 2 sign polarities). As indicated above, the lookup tables are configurable to include VSB and QAM in both baseband and passband implementations.

Figure 4B:
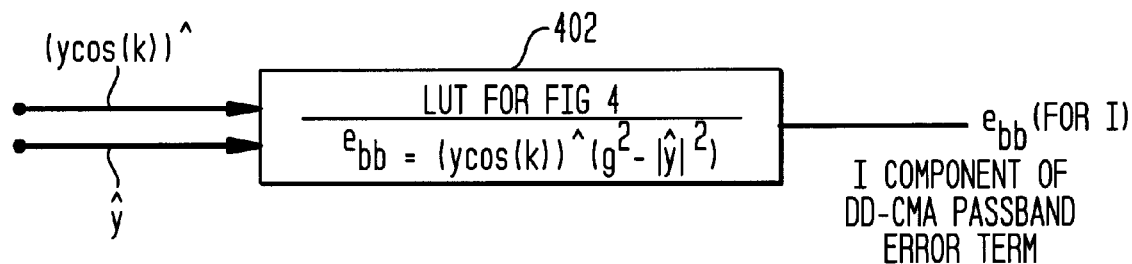
FIGS. 4B and 4C are lookup tables for use in the DD-CMA error calculator of FIG. 4.
Figure 4C:
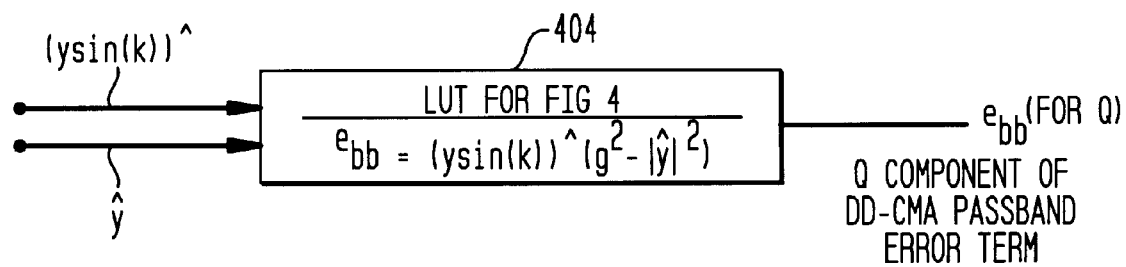
Figure 4D:
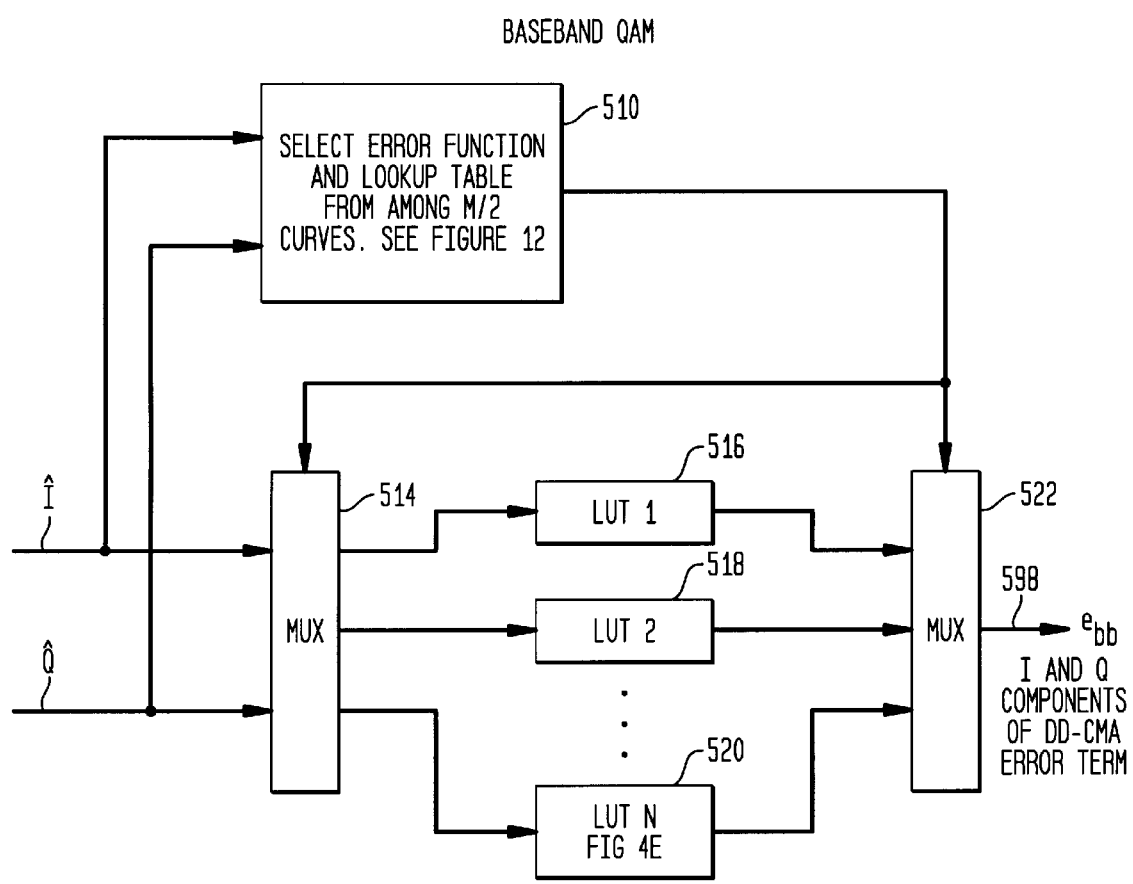
FIG. 4D is a block diagram of a decision directed CMA error term calculator for use in a baseband QAM equalizer in accordance with the present invention.
Figure 4E:
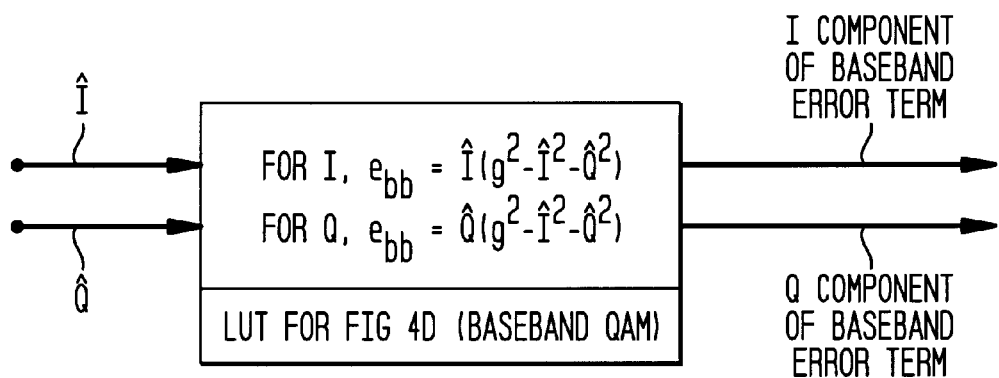
FIG. 4E is a lookup table for use in the DD-CMA error calculator of FIG. 4D.
Figure 4G:
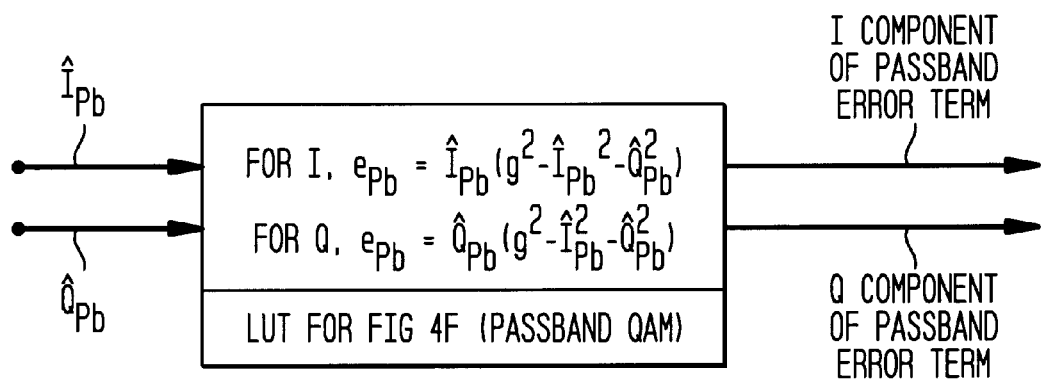
FIG. 4G is a lookup table for use in the DD-CMA error calculator of FIG. 4F.
Figure 4F:
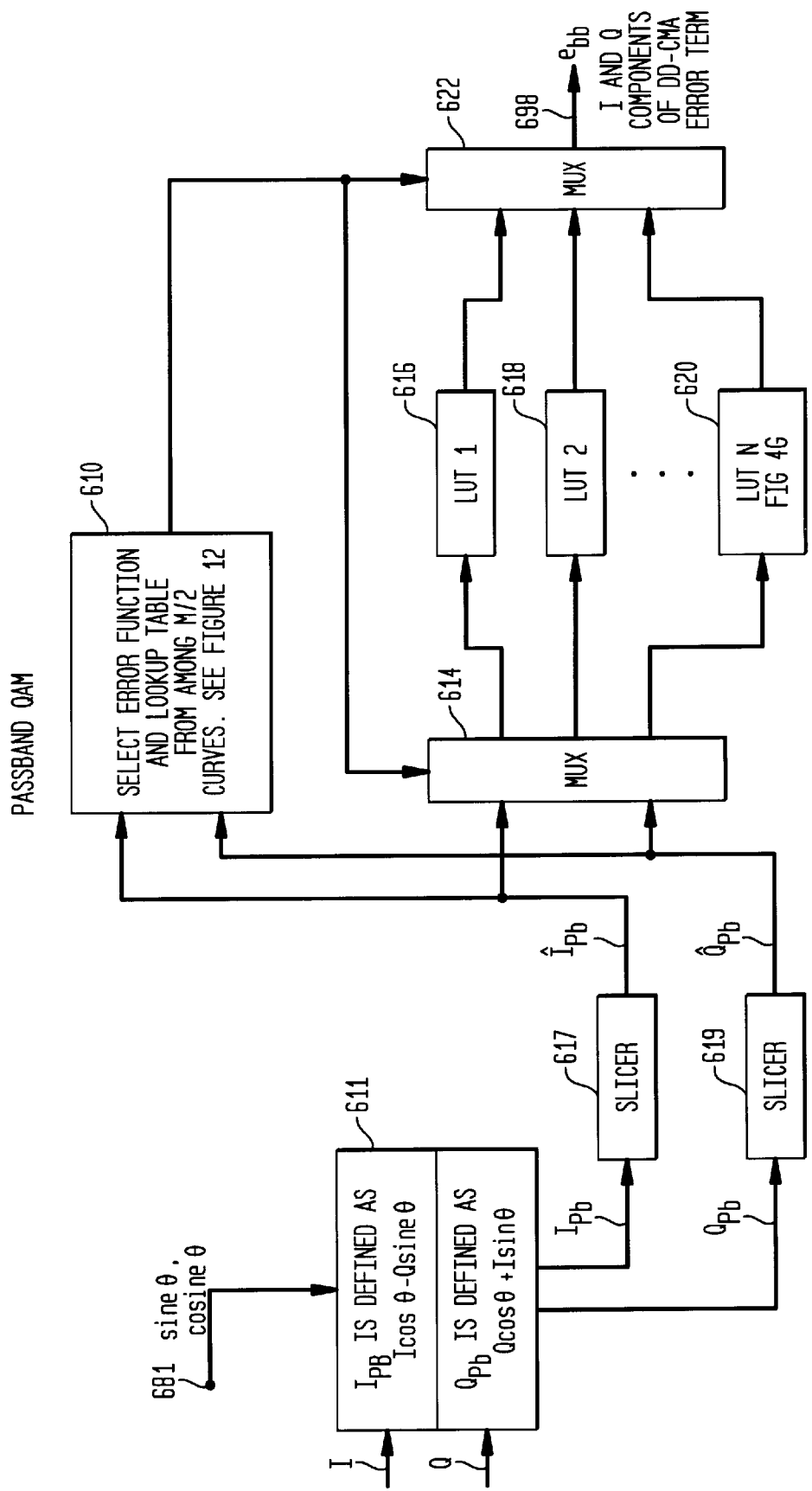
FIG. 4F is a block diagram of a decision directed CMA error term calculator for use in a passband QAM equalizer in accordance with the present invention.

FIGS. 4B, 4C, 4E and 4G illustrate various implementations of lookup tables that may be used for the lookup tables (416, 418, 420) in FIGS. 4, 4D and 4F. In particular, FIGS. 4B and 4C show the lookup table implementations with double indexing for the I and Q signal components, respectively, of the DD-CMA error term for passband VSB signaling in FIG. 4. FIG. 4E shows the lookup table implementation with double indexing for I and Q signal components, respectively, of the DD-CMA error term for baseband QAM signaling in FIG. 4D. FIG. 4G shows the lookup table implementation with double indexing for I and Q signal components, respectively, of the DD-CMA error term for passband QAM signaling 4F.

VSB Signaling

As previously described the baseband CMA error term $e_{bb}(k)$ for baseband signaling is given above as a cubic function of the equalizer output Y. The effect of quantizing the CMA error term is illustrated in FIG. 5. The solid line in FIG. 5 is the true CMA error term for 8-VSB signaling. The dashed line in FIG. 5 is the decision directed CMA (DD-CMA) error function computed in accordance with the present invention. The DD-CMA error term has six unique levels and three unique magnitudes. (By coincidence in FIG. 5, the magnitude of 84 is used twice on each side of the origin). For large-magnitude equalizer samples, FIG. 5 shows only one quantization level (about ±84). Having only a single quantization level for large output samples may slow initial algorithm convergence.

Extending the Slicer Values

Extending the slice levels of the decision device can substantially reduce the quantization error. For example, suppose the decision device is extended to slice 16-level in lieu of 8-level VSB signals. The 8-VSB levels are denoted by {±2, ±6, ±10, ±14}. The 16-level slice points are denoted by {±1, ±3, ±5, ±7 ±9, ±11, ±13, ±15}. By quantizing the 8-VSB signal as a 16-level signal, the quantization error is substantially reduced, as shown by the quantized DD-CMA error function in FIG. 6. Furthermore, the quantized DD-CMA error term (dashed line in FIG. 6) assumes two levels (approximately ±273 and ±1155) for larger equalizer outputs, as opposed to one quantization level (about ±84) when an 8-level slicer is used (dashed line in FIG. 5).

Having multiple quantization levels for larger equalizer outputs tends to improve the initial algorithm convergence rate. The extension of the decision device to include 16-level over 8-level slicing requires only a minimal increase in combinatorial logic. The quantization error, of the CMA error term, however, is substantially improved.

Mid-Tread Quantization

In each of the algorithms discussed above, the DD-CMA error term has non-zero values near the roots of the true CMA error term, i.e. at the origin and y=±g. These non-zero values of the DD-CMA error term tend to introduce jitter as the equalizer parameters converge towards a solution. The latter type of quantization is called mid-rise quantization, as compared to a mid-tread quantization, which assumes a zero value in some region on either side of the root locations. Since a mid-tread quantizer contains the zero value as a valid output, it maps small positive or negative values of CMA error to zero. Also, since the true CMA error is zero at the root locations, a mid-tread quantizer can have significantly better performance over a mid-rise quantizer. The differences between mid-tread and mid-rise quantizers are discussed by N. S. Jayant and P. Noll, in "Digital coding of waveforms," Englewood Cliffs, N.J.: Prentice Hall, 1984.

In an alternate embodiment of the present invention, a mid-rise quantization is converted to mid-tread quantization by modifying the slice levels of the decision device. A bias is applied to the slice values to shift the decision levels. For example, suppose the slice levels are chosen as {0, ±2, ±4, ±6 ±8, ±10, ±12, ±14} instead of {±1, ±3, ±5, ±7 ±9, ±11, ±13, ±15}. In such case, one half the magnitude of the minimum symbol is subtracted from the magnitude of each slice point. The bias removal yields mid-tread slice levels. The 8-VSB symbol values are now equal to every other 16-level slice value. Decision boundaries are chosen midway between slice points.

Figure 7:
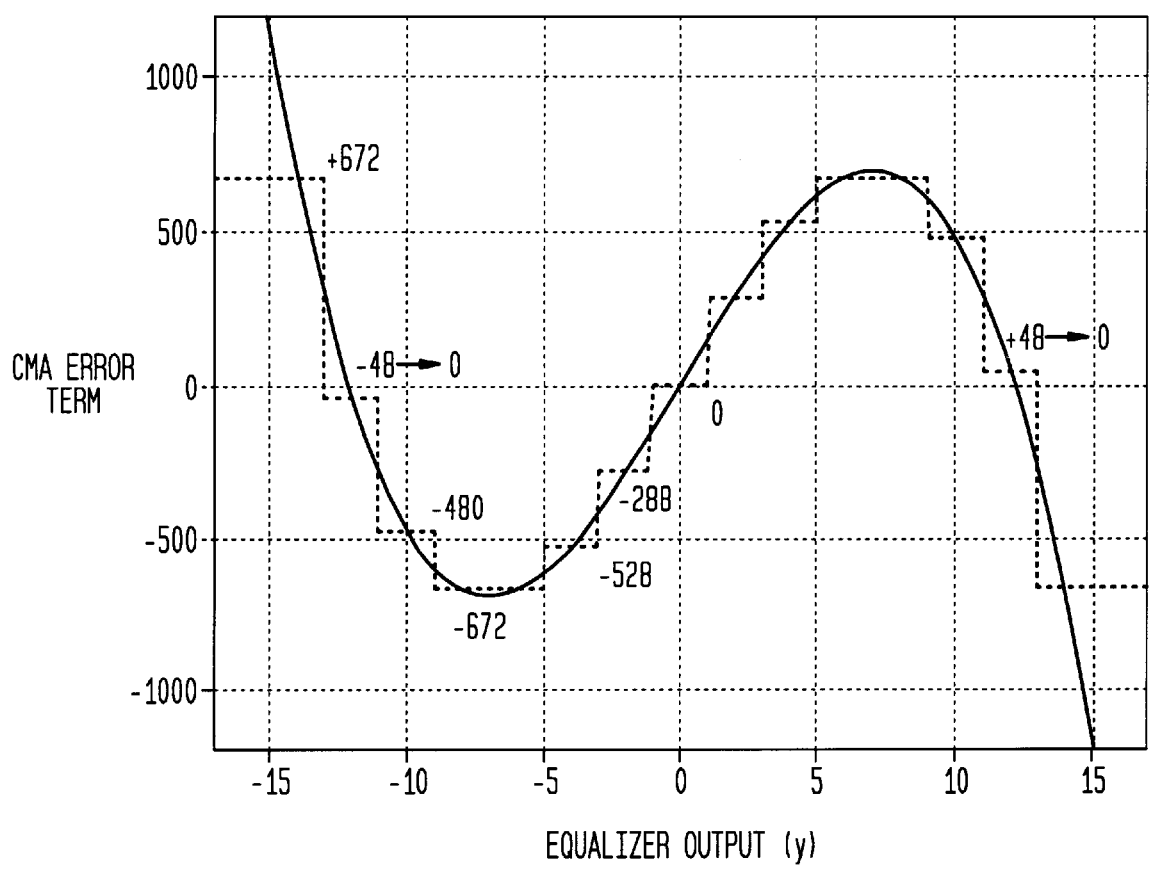
FIG. 7 is a graph of a CMA error function showing the use of 16 mid-rise quantization levels to quantize the CMA error function in accordance with the present invention.

FIG. 7 shows the resulting DD-CMA error term using mid-tread quantization (dashed line) for 8-VSB signaling. The mid-tread symbol quantization of the input symbols manifests itself in the CMA quantization as one mid-tread quantization at the origin, and two near-mid-tread CMA quantization levels at the cubic roots. As shown in FIG. 7, the DD-CMA error term assumes the zero value at the origin, but is still non-zero at the roots at ±g.

The reason that the DD-CMA error term value is not exactly zero near the ±g roots is that the Godard radius is not exactly equal to the square of the slice level near y=±g. For example, $g^2=148$ for 8-VSB signaling with the symbol set {±2, ±6, ±10, ±14}. However, the 16-level decision device produces a value of Y^=12 for 11<y<=13, and $12^2=144$ which does not exactly equal $g^2$ (148). By changing the Godard radius (to 144 in this case) the DD-CMA error term assumes zero values near all roots of the cubic. Alternatively, the quantization value at the root locations can be manually set to zero. A zero-state at the cubic roots helps reduce the mean-squared error or stochastic jitter as the equalizer converges to a solution.

Passband Error

For passband operation, (away from DC) the CMA error term is a rotated version of the baseband CMA error term; i.e., $e_{pb}=e^{j\theta(k)}e_{bb}$. The in phase (I) and quadrature (Q) components of the passband CMA error term are given separately as, $$e_{pb}I=\cos(\theta)*y(k)(g^2-|y(k)|^2)$$

$$e_{pb}Q=\sin(\theta)*y(k)(g^2-|y(k)|^2)$$

Figure 11:
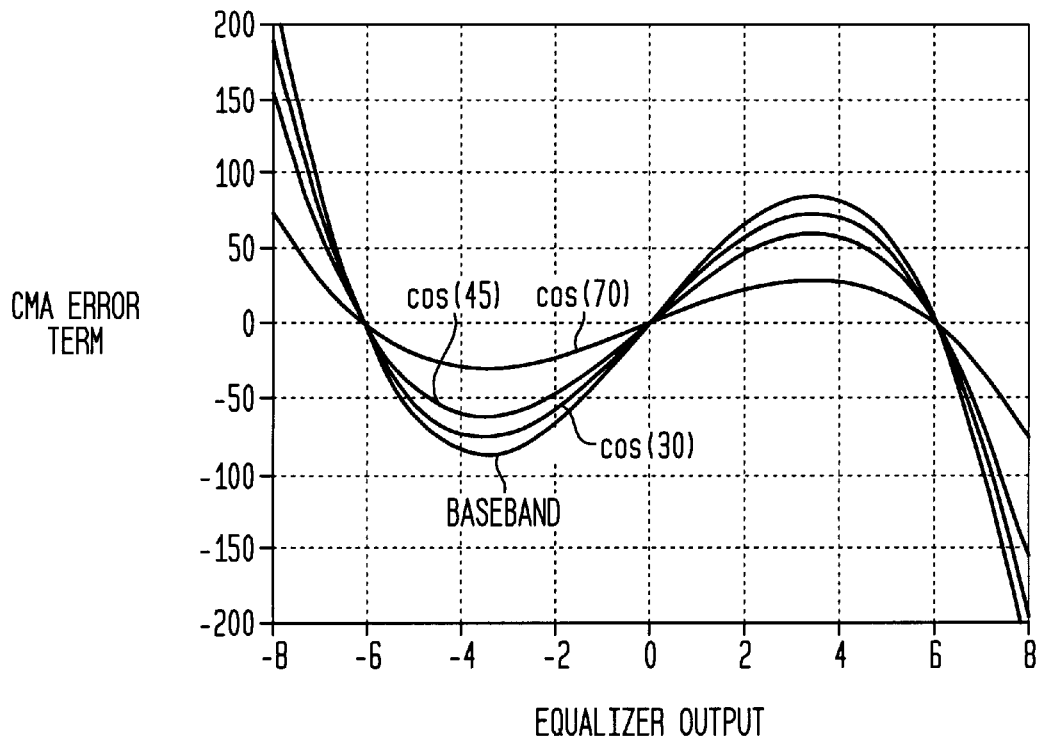
FIG. 11 is a graph of the in-phase component of a passband CMA error term for 8-VSB signaling used in conjunction with the present invention.

For VSB signaling where information is encoded in amplitude only (and not phase), y(k) is real-valued. In such case, the I and Q components of the passband error term are a function of the rotation angle and the equalizer output. The passband error components are scaled-in-magnitude versions of the baseband error term, but the roots of the cubic error function remain the same as the baseband error function. FIG. 11 shows the in-phase component of the passband CMA error term versus equalizer output Y for rotation angles 0, 30, 45 and 70 degrees.

A quantization procedure (similar to that used for the baseband error term) that will "track" the scaling due to rotation, is desired. The passband samples, defined as $y_{cos}(k)=\cos(\theta)*y(k)$ and $Y_{sin}(k)=\sin(\theta)*y(k)$ are passed into the nearest-element decision device and yield samples $y_{cos}(k)\hat{}$ and $Y_{sin}(k)\hat{}$, respectively. A DD-CMA error term for passband implementation is analogous to that which was disclosed for baseband implementation.

$$e_{pb}I(\text{DD-CMA})=[y_{cos}(k)\hat{}](g^2-|y(k)\hat{}|^2)$$

$$e_{pb}Q(\text{DD-CMA})=[y_{sin}(k)\hat{}](g^2-|y(k)\hat{}|^2)$$

The lookup tables in FIGS. 4B and 4C are indexed (addressed) to implement the above equations, respectively. The look-up table must be addressed by $y_{cos}(k)\hat{}$ and $y(k)\hat{}$ to calculate the I-component of the DD-CMA error term, or $y_{sin}(k)\hat{}$ and $y(k)\hat{}$ to calculate the Q-component, as illustrated in FIGS. 4B and 4C respectively. In particular, the lookup table for the passband implementation of the I component of the CMA error term is shown in FIG. 4B. The lookup table for the passband implementation of the Q component of the CMA error term is shown in FIG. 4C.

QAM Signaling

QAM signaling encodes information into both the RF carrier's amplitude and phase, and has become the standard for digital cable television transmission. In this case, the baseband equalizer output, y, is complex. Let y be represented by its real and imaginary parts, $y=I+jQ$. The baseband CMA error term can be written as $$e_{bb}=(I+jQ)*(g^2-I^2-Q^2)$$

which is separated into in-phase and quadrature components as follows, $$e_{bb}I=I*(g^2-I^2-Q^2)$$

$$e_{bb}Q=Q*(g^2-I^2-Q^2)$$

Unlike VSB signaling, there are two baseband components of the CMA error term. Let $I\hat{}$ and $Q\hat{}$ be the output of the nearest-element decision device for inputs I and Q, respectively. The analogous DD-CMA to the real-signaling case is to replace I by $I\hat{}$ and Q by $Q\hat{}$ in each of the in-phase and quadrature components of the error term, or $$e_{bb}I(\text{DD-CMA})=I\hat{}*(g^2-I\hat{}^2-Q\hat{}^2)$$

$$e_{bb}Q(\text{DD-CMA})=Q\hat{}*(g^2-I\hat{}^2-Q\hat{}^2)$$

Figure 8:
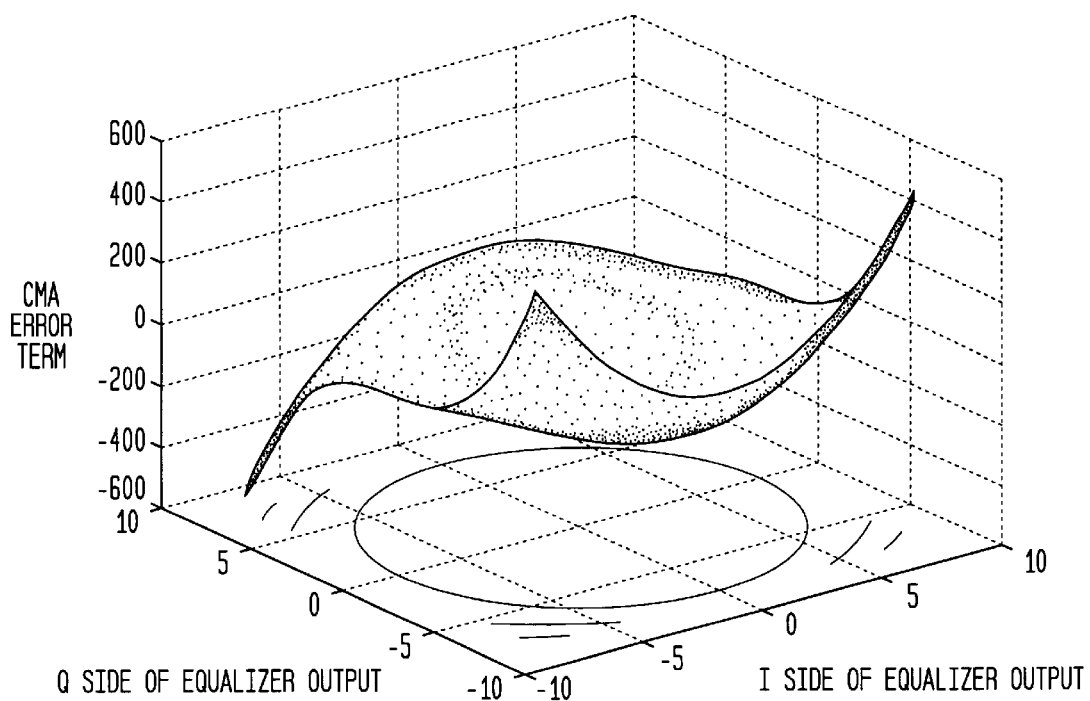
FIG. 8 is a graph of the in-phase component of the CMA error term for 64-QAM signaling shown as a surface above the I-Q plane with the in-phase component of the CMA error term being a function of two variables (I and Q).
Figure 9:
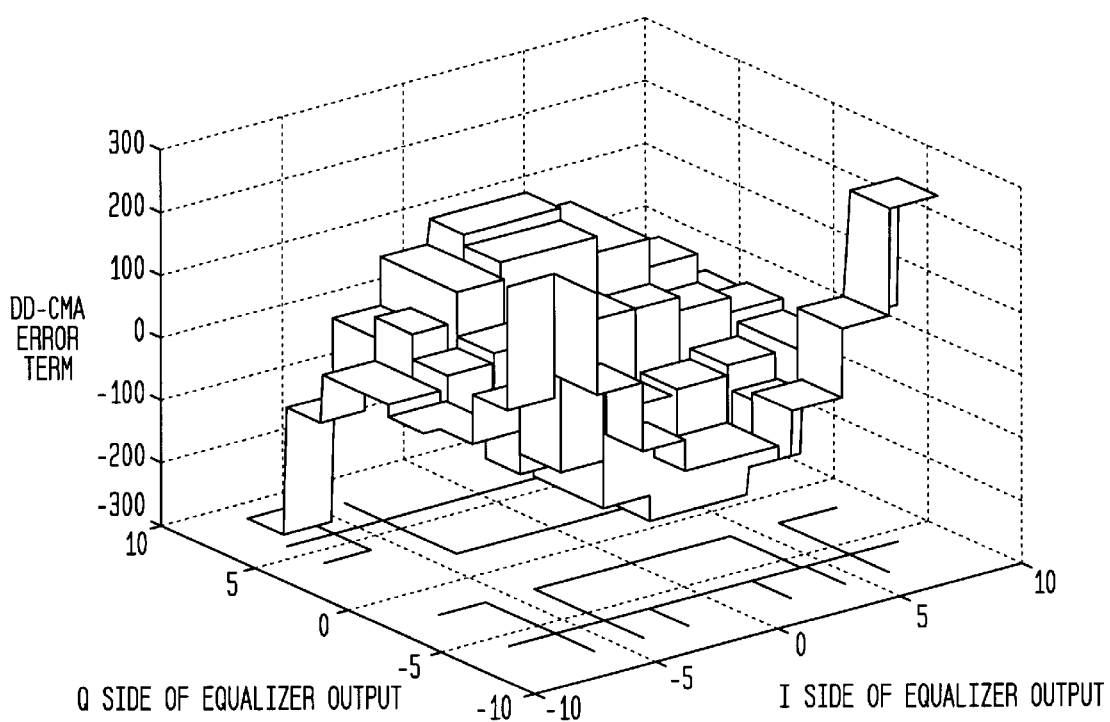
FIG. 9 is a graph of the in-phase component of the DD-CMA error term for 64-QAM signaling with 8-level slicing, shown as a surface above the I-Q plane, with the in-phase component of the DD-CMA error term being a function of two variables (I and Q).

For 64-QAM signaling with I and Q symbol values chosen from $\{\pm 1, \pm 3, \pm 5, \pm 7\}$, the in-phase component of the CMA error term is a function of the two variables, I and Q. The in-phase component is illustrated as a surface above the I-Q plane in FIG. 8. After quantization in accordance with the present invention, the continuous shape is quantized into discrete levels. FIG. 9 shows the I-component of the DD-CMA error term as a quantized surface above the I-Q plane, using 8-level slice values chosen from $\{\pm 1, \pm 3, \pm 5, \pm 7\}$. For $M^2$ QAM signaling, there are at most $M^2/2$ levels in each of the I and Q components of the DD-CMA error term.

Figure 10:
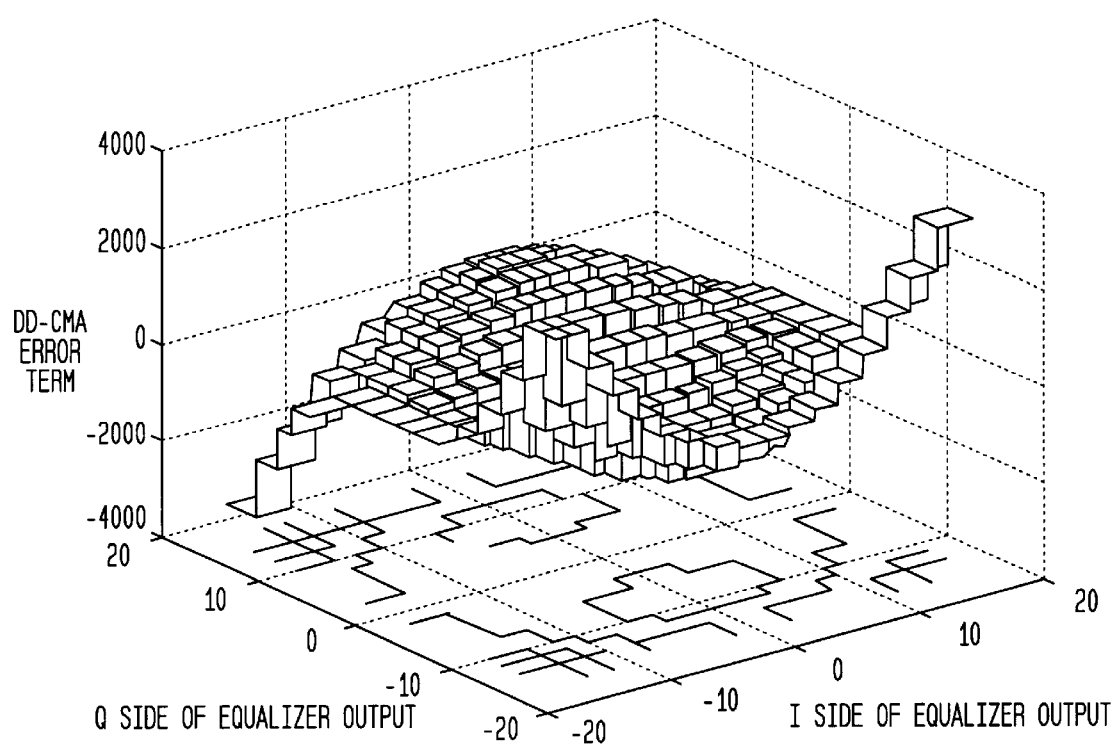
FIG. 10 is a graph of the in-phase component of the DD-CMA error term for 64-QAM signaling with 16-level slicing, shown as a surface above the I-Q plane with the in-phase component of the DD-CMA error term being a function of two variables.

The quantization in FIG. 9 is coarse, but may be adequate in many applications. Significant improvement can be found by using a 256-QAM (16-levels in I and Q components) decision device for 64-QAM signaling. (This approach is similar to that used above for 8-VSB signaling by extending the decision device to include 16-VSB slice values). For example in 64-QAM, the I and Q symbol values are chosen from $\{\pm 2, \pm 6, \pm 10, \pm 14\}$ and the slice points are chosen as $\{\pm 1 \pm 3 \ldots \pm 15\}$. FIG. 10 shows the quantized DD-CMA error term as a surface above the I-Q plane. A 256-QAM 16-level slicer is used on 64-QAM samples to produce the decisions for the DD-CMA error term. The addition in complexity to the decision device is minimal, while the quantization of the update CMA error term is substantially improved.

Passband Implementation

When the equalizer processes samples which are away from DC (passband), the baseband error term is rotated to form the passband error term, or $e_{pb}=e_{bb}e^{j\theta(k)}$. The I and Q components of the passband CMA error term are given by $$e_{pb}I=[\cos(\theta)I-\sin(\theta)Q]*(g^2-I^2-Q^2)$$

$$e_{pb}Q=[\cos(\theta)Q+\sin(\theta)I]*(g^2-I^2-Q^2)$$

The components of the passband equalizer output sample are defined as $I_{pb}=[\cos(\theta)I-\sin(\theta)Q]$ and $Q_{pb}=[\cos(\theta)Q+\sin(\theta)I]$ and the quantized values from the decision device are $I_{pb}\hat{}$ and $Q_{pb}\hat{}$, respectively. The decision directed CMA (DD-CMA) update error term is found by replacing the baseband and passband samples in the usual passband CMA error term with their best estimates from the decision device, or $$e_{pb}I(\text{DD-CMA})=I_{pb}\hat{}*(g^2-I\hat{}^2-Q\hat{}^2)$$

$$e_{pb}Q(\text{DD-CMA})=Q_{pb}\hat{}*(g^2-I\hat{}^2-Q\hat{}^2)$$

To implement the above equations in lookup tables would require triple indexing (addressing). That is, each component of the in-phase and quadrature component of the DD-CMA error term is a function of three variables: the quantized baseband samples and each of the components of the quantized I and Q passband samples.

To use look-up tables to calculate the DD-CMA error term addressed by $I_{pb}\hat{}(k)$, $I\hat{}(k)$, and $Q\hat{}(k)$ (for the I-component of the DD-CMA error term), or addressed by $Q_{pb}\hat{}(k)$, $I\hat{}(k)$, and $Q\hat{}(k)$ (for the Q-component of the DD-CMA error term) would require triple indexing.

Double Indexing of the Lookup Tables

The DD-CMA error term can be modified for QAM passband signaling so that the requirement of triple indexing is reduced to double indexing of the look up table, which greatly reduces the memory size of the required lookup table. For example, since the passband sample is a rotated version of the baseband sample, then $I^2+Q^2=I_{pb}^2+Q_{pb}^2$, i.e., the passband and baseband samples have equal squared magnitudes. When quantized samples are considered, $I\hat{}^2+Q\hat{}^2$ is not in general equal to $I_{pb}\hat{}^2+Q_{pb}\hat{}^2$. However, if it is assumed that $I\hat{}^2+Q\hat{}^2$ can be approximated by $I_{pb}\hat{}^2+Q_{pb}\hat{}^2$, then the in-phase and quadrature components of the DD-CMA error terms for passband QAM signaling are modified to be $$e_{pb}I(\text{DD-CMA})=I_{pb}\hat{}(g^2-I_{pb}\hat{}^2-Q_{pb}\hat{}^2)$$

and $$e_{pb}Q(\text{DD-CMA})=Q_{pb}\hat{}(g^2-I_{pb}\hat{}^2-Q_{pb}\hat{}^2)$$

For the above equations, the lookup tables in FIG. 4F require double indexing, as shown in FIG. 4G, instead of triple indexing.

The number (N) of lookup tables (LUT 1 to LUT N in FIG. 4) required for implementation of the present DD-CMA algorithm depends upon the modulation scheme used at the transmitter, and whether baseband or passband processing is used at the receiver. For example, FIG. 11 illustrates the in-phase component of a passband CMA error term for 8-VSB signaling. The I component of the passband CMA error term for 8-VSB signaling is shown at rotation angles of 0 (baseband), 30, 45 and 70 degrees. In VSB, there is essentially one CMA error curve, which is multiplied by a rotation angle factor to obtain the CMA error term. Therefore, only one lookup table (FIG. 4A) is required for VSB baseband processing. For VSB passband processing, the size of the lookup table is enlarged to accommodate indexing as a function of the rotation angle.

Figure 12:
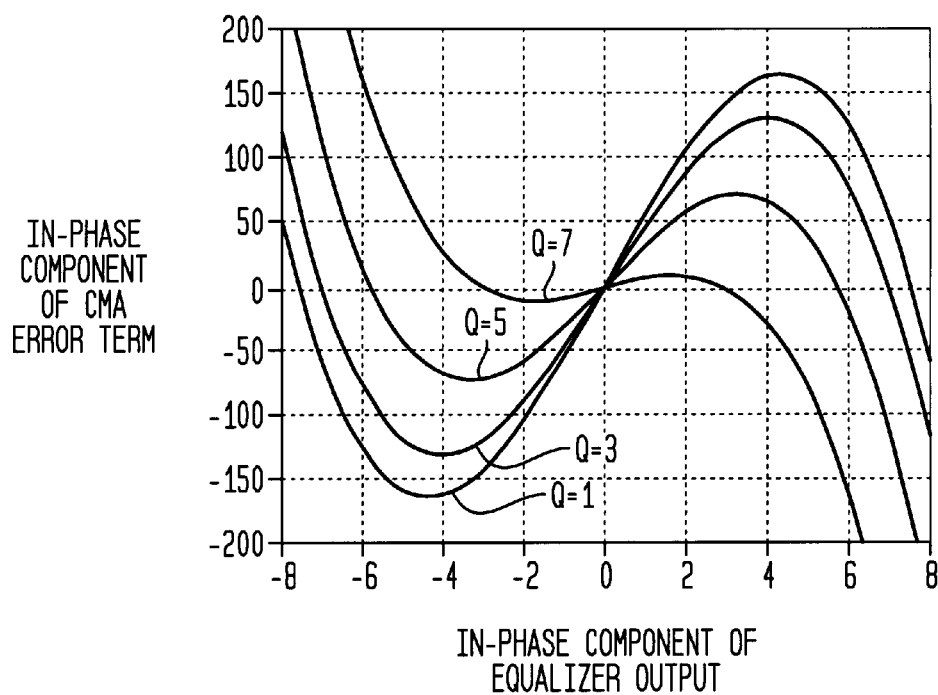
FIG. 12 is a graph of the in-phase component of a CMA error function for QAM signaling used in conjunction with the present invention.

In the case of quadrature amplitude modulation (QAM) there are a family of CMA error curves. The in-phase component of a CMA error function for QAM signaling is shown in FIG. 12. For QAM signaling, where information is encoded into the RF carrier in both amplitude and phase, the baseband equalizer output, y, is a complex variable. The desired CMA error function is then determined from a family of CMA error function curves rather than the single baseband error function curve, as in the case of VSB signaling in FIG. 11.

In the general case (including QAM signaling), each of the family of CMA error function curves is independently quantized using the above-described DD-CMA approach. The pre-computed quantized CMA error function curves are stored in a corresponding plurality of lookup tables.

After the lookup tables are created, the receiver is ready to process digital signals. During QAM signal acquisition, when the equalizer parameters are being initialized, the appropriate CMA error function curve (selected from the family of CMA error function curves in FIG. 12) is determined. The lookup table corresponding to the selected CMA error function curve is selected at the receiver. The selected lookup table, which stores the pre-computed DD-CMA error function ($e_n$), is retrieved and used to adjust the parameters of the adaptive equalizer. In an $M^2$ level-QAM system, the number of unique error function curves is equal to (M/2). By way of example, in a 64-QAM system, where M=8, 4 lookup tables are required for baseband signal processing. For QAM passband processing, the size of the lookup tables is enlarged to accommodate indexing as a function of the rotation angle.

Baseband VSB Signaling, FIG. 4A

In operation in FIG. 4A, the DD-CMA error term is determined by addressing a lookup table 400, by the single variable, $Y^{\wedge}$ which is a quantized 401 version of the received signal Y at the output of the equalizer. If N-level signaling is used with symbol values $\{-(N-1) \ldots \pm 3, \pm 1, 1, 3, \ldots (N-1)\}$, the DD-CMA error term assumes N/2 magnitudes for elements of this symbol set. The pre-computed elements are stored in the lookup table, and retrieved from the lookup table 400 by the index (address) of the value of $Y^{\wedge}$ in the symbol set.

Baseband VSB Signaling, FIG. 4

In operation in FIG. 4, the baseband equalizer output at input terminal 480 is applied to computing module 411. The cosine (or sine) of the received carrier phase angle $_\theta$ at terminal 481 is applied to the lookup table selector 410. For each of the possible received carrier phase angles, $_\theta$, a CMA error function curve (from a family of curves such as shown in FIG. 11) is selected 410. The cosine (or sine) of the received carrier phase angle is also applied to computing module 411 where the respective product term, $y_{cos}(k)$ (or $Y_{sin}(k)$), is calculated.

The calculated product term(s) are quantized into discrete levels in slicer 417, as is the input Y in slicer 419. The N lookup tables 416, 418, 420 are thus addressed by two variables: $y_{cos}(k)^{\wedge}$ (or $Y_{sin}(k)^{\wedge}$) and $Y^{\wedge}$. Variables $y_{cos}(k)^{\wedge}$ and $Y^{\wedge}$ address the bank of look up tables for retrieval of the I component of the DD-CMA error term, while variables $Y_{sin}(k)^{\wedge}$ and $Y^{\wedge}$ address the bank of look up tables for retrieval of the Q component of the DD-CMA error term. The I and Q components of the DD-CMA error term are to be retrieved from among N lookup tables, where the number of lookup tables is equal to the number of quantization levels of the received carrier phase angle, $_\theta$.

For each of the possible DD-CMA error curves that might be selected 410, an appropriate lookup table is determined. Based on the selected DD-CMA error function curve, multiplexer 414, responsive to the selection module 410, applies the quantized terms from slicers 419, 417, i.e., $Y^{\wedge}$ and $Y_{cos}(k)^{\wedge}$ (or $Y_{sin}(k)^{\wedge}$) to the selected lookup table. At the same time, multiplexer 422, responsive to the selection module 410, selects the output of the appropriate lookup table 416, 418, 420 (LUT 1, LUT 2, and LUT N) to go to the output terminal 498.

The lookup tables for use with the DD-CMA error quantizer of FIG. 4 are shown in FIGS. 4B and 4C. To compute the I component of the DD-CMA error term, the lookup table in FIG. 4B in used in FIG. 4. To compute the Q component of the DD-CMA error term, the lookup table in FIG. 4C in used in FIG. 4. The output of the selected lookup table at terminal 498 is the quantized value of the DD-CMA error term, $e_{bb}(k)$, which is used in further computations to the update the parameters of the equalization filter.

Thus the error quantizer of FIG. 4 uses hard decision values to quantize the CMA error function, which hard decision values are used to pre-compute DD-CMA error function values which are stored in a plurality of lookup tables, and retrieved during the equalization process. Other embodiments of the invention are shown in the examples in FIGS. 4D and 4F.

Baseband QAM, FIGS. 4D, 4E

The operation of the CMA error term quantizer in FIG. 4D is similar to that of FIG. 4. In operation in FIG. 4D, the input $I^{\wedge}$ and $Q^{\wedge}$ values are applied to the lookup table selector 510. For each pair of expected values of $I^{\wedge}$ and $Q^{\wedge}$, a CMA error function curve is selected 510, from a family of CMA error function curves (as for example, as shown in FIG. 12).

The input $I^{\wedge}$ and $Q^{\wedge}$ values are also applied to multiplexer 514. For each of the possible CMA error curves that might be selected 510, an appropriate lookup table 516, 518 or 520 is determined. Based on the selected CMA error function curve, multiplexer 514, responsive to the selection module 510, applies the quantized input terms $I^{\wedge}$ and $Q^{\wedge}$ to the selected lookup table via multiplexer 514. At the same time, multiplexer 422, responsive to the selection module 410, selects the output of the appropriate lookup table 416, 418, 420 (LUT 1, LUT 2, and LUT N) to go to the output terminal 498.

A lookup table for use with the CMA error quantizer of FIG. 4D is shown in FIG. 4E. For baseband $M^2$-QAM signaling, the I and Q components of the DD-CMA error term require M/2 lookup tables (for example, M=8 in 64-QAM which requires 4 lookup tables). The indices of $I^{\wedge}$ and $Q^{\wedge}$ address the bank of lookup tables and the DD-CMA error term is retrieved at the output terminal of the multiplexer 522. When computing the I component of the DD-CMA error term, the index of the value of $Q^{\wedge}$ controls the multiplexers 514, 522. Similarly, when computing the Q component of the DD-CMA error term, the index of the value of $I^{\wedge}$ controls the multiplexers 514, 522.

The output of the selected lookup table at terminal 598 provides the quantized I and Q components of the CMA error values of the CMA error term, $e_{bb}(k)$, which are used in further computations to the update the parameters of the equalization filter.

Passband QAM, FIGS. 4F and 4G

For passband QAM signaling, an approximation is made that $I_{pb}^2 + Q_{pb}^2$ is approximately equal to $I_{pb}^{\wedge 2} + Q_{pb}^{\wedge 2}$. As a result of the approximation, two variables rather than three variables are needed to address the bank of lookup tables. FIGS. 4F and 4G show the implementation for the retrieval of the I and Q components of the DD-CMA error term.

The operation of the DD-CMA error term quantizer in FIG. 4F is similar to that of FIGS. 4 and 4D. In operation in FIG. 4F, the input I and Q values are applied to computing module 611. At the same time, the sine and cosine of the received carrier phase angle $\theta$ is applied at terminal 681 and input to computing module 611, which computes the formulas indicated. The output of the computing module 611, labeled $I_{pb}$ and $Q_{pb}$, are coupled to slicers 617 and 619, respectively, to provide their expected values, $I_{pb}^{\wedge}$ and $Q_{pb}^{\wedge}$, which are applied to selector module 610 and the inputs to multiplexer 614.

For each pair of possible expected values $I_{pb}^{\wedge}$ and $Q_{pb}^{\wedge}$, one of the DD-CMA error function curves (as for example, the family of error function curves shown in FIG. 12) is selected 610. For each of the possible DD-CMA error curves that might be selected 610, an appropriate lookup table is determined.

Based on the selected CMA error function curve, multiplexer 614, responsive to the selection module 610, applies the quantized terms from slicers 617, 619, i.e., $I_{pb}^{\wedge}$ and $Q_{pb}^{\wedge}$, to the selected lookup table. At the same time, multiplexer 622, responsive to the selection module 610, selects the output of the appropriate lookup table 616, 618, 620 (LUT 1, LUT 2, and LUT N) to go to the output terminal 698. The lookup tables for use with the DD-CMA error quantizer of FIG. 4F are shown in FIG. 4G. The output of the selected lookup table at terminal 698 is the quantized value of the DD-CMA error term, $e_{bb}(k)$, which is used in further computations to the update the parameters of the equalization filter.

Low Complexity Implementation

The above described methods for producing low-complexity versions of the CMA error term for baseband and passband equalizers include quantization of the update DD-CMA error term to assume a finite number of values, suitable for using a lookup table implementation, and thus reducing multiplier count. In addition, the delay in processing the update equation is reduced.

After the lookup table, the update CMA error term must still be applied to each equalizer parameter in order to update the entire tapped delay line. One implementation for the application of the error term is to use low bit-width multipliers. For example, in the absence of our DD-CMA error term, typically 12–16 bit precision is used to represent the equalizer error term. If the data in the regressor vector is stored with 10-bit precision, this implies the use of a (12–16×10) multiplier for each equalizer parameter. However, with the low precision of the DD-CMA error term, 4–6 bit precision is sufficient and multiplier area is significantly reduced.

Alternatively, shifts and adders can be used in place of multipliers. For this purpose, contents of the lookup tables (the DD-CMA error term values) are selected to be powers of 2, or the sum of powers of 2, which numbers make efficient use of shift and add operations to achieve multiplication in the adaptation process.

Figure 6:
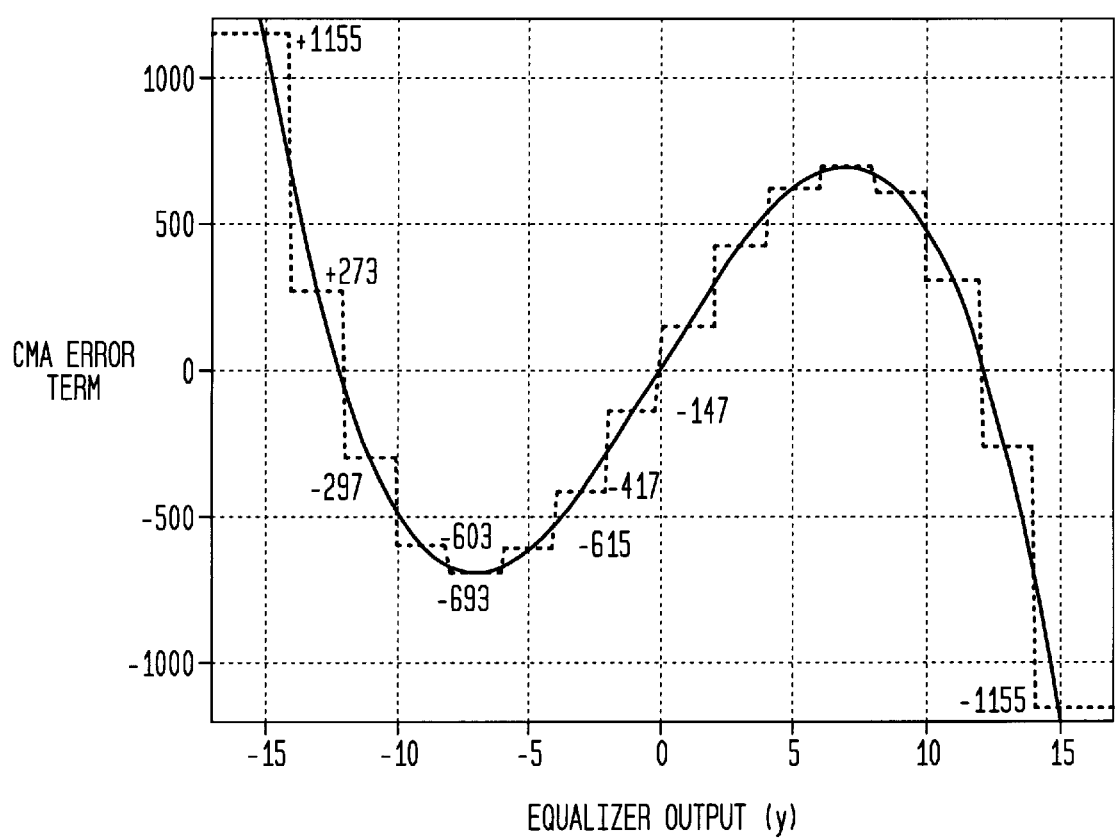
FIG. 6 is a graph of a CMA error function showing the use of 16 mid-tread quantization levels to quantize the DD-CMA error function in accordance with the present invention.

For example, use a canonical-sum-digits representation to write the error term as $$e(\text{DD-CMA}) = \Sigma_I(a_I * 2^{-Z_I})$$

where $a_I$ assumes values $\{0,-1,+1\}$, and $Z_I$ are integers. The product of the regressor sample, $r(k)$, and the error term is then expressed as $$e(\text{DD-CMA}) = \Sigma_I(a_I * r(k) * 2^{-Z_I})$$

which can be implemented using shifts and adders. Since the error term is generated using a look-up table, the look-up values can be changed to output the $a_I$ values instead. In the general case, addition includes subtraction when signed factors are considered. Numerical examples corresponding to FIGS. 5, 6 and 7 are given below.

As labeled in FIG. 5, the quantized CMA error term for 8-VSB signaling has six unique levels and three unique magnitudes (84 is used twice on each side of the origin by coincidence). Each of these quantization levels are factored into powers of 2 as follows:

$$84 = 64 + 16 + 4$$

$$60 = 64 - 4$$

$$36 = 32 + 4$$

Note that the use of negative numbers for the powers of 2 summation results in fewer shift and add operations. For example, 60 is expressed above as the sum of two powers of 2: +64 and −4. Multiplication requires two shift and add operations. If 60 were expressed in positive numbers of powers of 2, result would be the sum of four powers of 2 (32+16+8+4). Using all positive numbers results in 4 shift and add operations. Using both positive and negative numbers saves 2 shift and add operations.

For FIG. 6, the quantization levels and power of 2 factors are:

$$1155 = 1024 + 128 + 2 + 1$$

$$273 = 256 + 16 + 1$$

$$297 = 256 + 32 + 8 + 1$$

$$603 = 512 + 128 + 64 + 32 - 4 - 1$$

$$693 = 512 + 128 + 64 - 8 - 2 - 1$$

$$615 = 512 + 128 - 32 + 8 - 1$$

$$417 = 256 + 128 + 32 + 1$$

$$147 = 128 + 16 + 2 + 1$$

These levels may be adjusted manually to reduce the number of shift and add operations by dropping the ±1 terms as follows:

$$1154 = 1024 + 128 + 2$$

$$272 = 256 + 16$$

$$296 = 256 + 32 + 8$$

$$604 = 512 + 128 + 64 + 32 - 4$$

$$694 = 512 + 128 + 64 - 8 - 2$$

$$616 = 512 + 128 - 32 + 8$$

$$416 = 256 + 128 + 32$$

$$146=128+16+2$$

In such manner, one shift and add operation for each quantization level is eliminated. For example, to multiply by 1153 takes 4 shift and add operations, but to multiply by 1154 takes only 3 shift and add operations, saving one shift and add operation.

For FIG. 7, the quantization levels and power of 2 factors are:

$$672=512+128+32$$
$$48=32+16$$
$$480=512-32$$
$$528=512+16$$
$$288=256+32$$
$$0=0$$

The above quantization numbers (quantization levels are shown in FIG. 7), representing the pre-computed DD-CMA error terms are rapidly retrieved from lookup table memory during the receiver operation. Due to the efficient factoring of each quantization level into a minimal set of powers of 2, the retrieved DD-CMA error terms provide for efficient multiply operations using shifts and adders.

For the purpose of improving stability by reducing jitter, it is advantageous to set the quantization levels at the roots of the CMA error function (the zero crossings at ±g) to zero. In such case, the quantization levels in FIG. 7, and power of 2 factors are:

$$672=512+128+32$$
$$0$$
$$480=512-32$$
$$528=512+16$$
$$288=256+32$$
$$0=0$$

FIG. 7 indicates that ±48 levels at the ±g roots of the CMA error function are set to zero. In addition to improved stability, setting the quantization level to zero at the roots of the DD-CMA error function has the further advantage of eliminating two shift and add operations when computing the updated equalizer filter parameters.

What is claimed is:

1. In a digital communications receiver including an equalization filter having a plurality of adjustable parameters, and an error term calculator for updating said plurality of adjustable parameters, said error term calculator responsive to a received digital signal and the error in said received digital signal, said error term calculator including an error function which is a function of said received digital signal, a quantization method comprising:

selecting a plurality of quantization levels corresponding to said received digital signal;

computing said error function for each of said plurality of quantization levels to form a quantized error function; and storing said quantized error function in a lookup table.

2. A method in accordance with claim 1, further comprising:

receiving said digital signal;

retrieving a value of said quantized error function from said lookup table responsive to said received digital signal; and using said retrieved value of said quantized error function to update said plurality of adjustable parameters of said equalization filter.

3. A quantization method in accordance with claim 2, wherein said digital communications receiver further includes QAM passband signaling having an in-phase signal component I, a quadrature phase signal component Q, an in-phase passband signal component $I_{pb}$ and a quadrature phase passband signal component $I_{pb}$, wherein said step of retrieving a value of said quantized error function from said lookup table responsive to said received digital signal further includes the step of approximating $I^{\wedge 2}+Q^{\wedge 2}$ by the term $I_{pb}^{\wedge 2}+Q_{pb}^{\wedge 2}$.

4. A quantization method in accordance with claim 1, wherein a quantization level of said error function is selected to be a power of 2.

5. A quantization method in accordance with claim 1, wherein a quantization level of said error function is selected to be the sum of at least two numbers, each of which numbers is a power of 2.

6. A quantization method in accordance with claim 1, wherein a quantization level of said quantized error function is selected to be the sum of at least two numbers, wherein one of which two numbers is positive and the other of which two numbers is negative and both of which two numbers have an absolute value equal to a power of 2.

7. A quantization method in accordance with claim 1, wherein said error term calculator for updating said plurality of adjustable parameters uses the Constant Modulus Algorithm (CMA) error function.

8. In a digital communications receiver including an equalization filter having a plurality of adjustable parameters, and an error term calculator for updating said plurality of adjustable parameters, said error term calculator responsive to a received digital signal and the error in said received digital signal, said error term calculator including an error function which is a function of said received digital signal, an apparatus comprising:

a digital signal receiver having an output corresponding to said received digital signal;

a lookup table having a respective input and output, said input of said lookup table responsive to said received digital signal, said output from said lookup table corresponding to said error function, said lookup table containing values of said error function computed by selecting a plurality of quantization levels corresponding to said received digital signal and computing said error function for each of said plurality of quantization levels to form a quantized error function, said lookup table storing said quantized error function; and the output of said lookup table being coupled to said equalization filter to update said plurality of adjustable parameters of said equalization filter using said values of said quantized error function stored in said lookup table.

9. A quantization apparatus in accordance with claim 8, wherein a quantization level of said error function is selected to be a power of 2.

10. A quantization apparatus in accordance with claim 8, wherein a quantization level of said error function is selected to be the sum of at least two numbers, each of which numbers is a power of 2.

11. A quantization apparatus in accordance with claim 8, wherein a quantization level of said quantized error function is selected to be the sum of at least two numbers, wherein one of which two numbers is positive and the other of which two numbers is negative and both of which two numbers have an absolute value equal to a power of 2.

12. A quantization apparatus in accordance with claim 8, wherein said error term calculator for updating said plurality of adjustable parameters uses the Constant Modulus Algorithm (CMA) error function.

13. A quantization apparatus in accordance with claim 8, wherein said digital communications receiver further includes QAM passband signaling having an in-phase signal component I, a quadrature phase signal component Q, an in-phase passband signal component $I_{pb}$ and a quadrature phase passband signal component $I_{pb}$, wherein said lookup table is responsive to inputs $I_{pb}\hat{}$ and $Q_{pb}\hat{}$, wherein the sum of $I^{\wedge 2}{}_{+}Q^{\wedge 2}$ is approximated by the sum of $I_{pb}\hat{}^2{}_{+}Q_{pb}\hat{}^2$.

\* \* \* \* \*